(No Model.)
H. T. JOHNSON.
GALVANIC BATTERY.
No. 487,839. Patented Dec. 13, 1892.
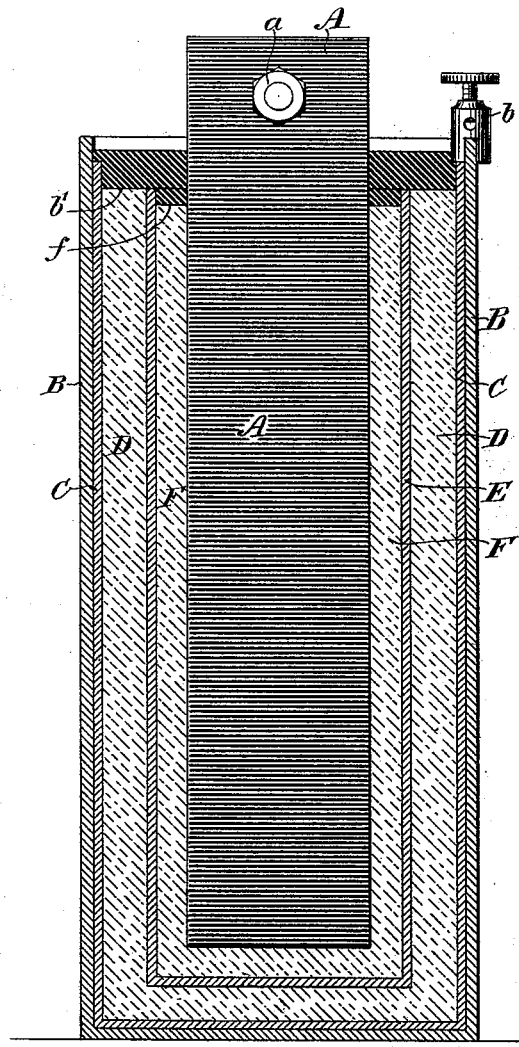
Witnesses
Edward Thorpe
W. H. Shaw
Inventor
Harry T. Johnson
By his Attorneys
Murphey & Metcalf

UNITED STATES PATENT OFFICE.

HARRY T. JOHNSON, OF NEW YORK, N. Y.

GALVANIC BATTERY.

SPECIFICATION forming part of Letters Patent No. 487,839, dated December 13, 1892.

Original application filed July 22, 1891, Serial No. 400,309. Divided and this application filed April 1, 1892. Serial No. 427,373.

(No model.)

*To all whom it may concern:*

Be it known that I, HARRY T. JOHNSON, of the city, county, and State of New York, have invented certain new and useful Improvements in Galvanic Batteries, of which the following is a full, clear, and exact description, reference being had to the accompanying drawing, forming part of this specification.

My invention relates to that particular class of galvanic batteries technically known as "dry batteries," in which the exciting liquid of the battery is thickened or densified by being mixed with a powdered or granulated substance. Two serious defects exist in all batteries of this character. One of these is the unequal distribution of moisture in the substance composing the active elements of the cells, whereby their life and efficiency are much impaired. The other defect exists in batteries of the character referred to, in which the negative electrode is surrounded with powdered carbon or other comminuted substance possessing good conductive properties for the purpose of diminishing the internal resistance of the cells. In this form of battery the powdered carbon or other substance under the action of the gases generated in the battery is frequently forced through the exciting and depolarizing mixture of the battery and contacts with the positive electrode, whereby the battery is short-circuited and the local action thus produced at the positive electrode soon destroys it and exhausts the cell. The object of my invention is to obviate these defects by insuring a more uniform distribution of moisture in the battery and at the same time preventing the particles of conducting substance from contacting with the positive electrode; and to this end it consists in the novel details of construction and arrangement and combination of parts hereinafter described, and specifically pointed out in the claim.

The accompanying drawing represents a sectional elevation of my improved battery.

In said drawing, A represents the negative electrode of the battery, formed, preferably, of carbon and provided with a binding-screw $a$, to which one terminal of an electrical conductor is to be secured. The positive electrode B consists of a cup-shaped vessel of zinc or other suitable material, which is also provided with a binding-screw for the connection of the other terminal of the external circuit. The exciting and depolarizing substances employed in the battery are contained in the layers D and F. For the exciting-salt I usually employ sal-ammoniac and for the depolarizer peroxide of manganese may be used; but any suitable substances may be used in their stead—such, for instance, as chloride of sodium for the excitant and dilute chromic acid or other substance for the depolarizer. With the mixture containing the exciting agent is preferably mixed some insoluble substance—such as plaster-of-paris—in such proportion that when liquid is added thereto a paste-like substance is formed. The negative electrode A is preferably surrounded with a mixture of crushed or granulated carbon and manganese in about equal proportions, the function of the carbon being the reduction of the internal resistance of the battery, and the mixture after being well tamped around the negative electrode is moistened with water. Between the layers D and F, I insert a layer or lining E of absorbent substance—such as blotting or absorbent paper—which is capable of absorbing and retaining for a comparatively-long period a relatively-large amount of moisture, whereby I secure a very equable distribution of moisture between the layers D and F, and where the layer F contains granulated carbon as one of its constituent parts this layer or lining E also prevents the particles of carbon from penetrating the depolarizing and exciting agents and contacting with the positive electrode, thereby preventing the short-circuiting of the battery from this cause. This layer or lining E is preferably in the form of a cup or cylinder.

In order to facilitate the removal of the contents of the battery after it has become exhausted, I also employ a layer or lining C of porous substance between the layer D and the positive electrode. This prevents the adherence of the layer to the positive electrode and renders it extremely easy to remove an old charge and clean the zinc electrode preparatory to recharging it. Any suitable fibrous or absorbent material may be employed for this purpose; but I prefer blotting-paper, because it serves, also, to hold considerable moisture in suspension in the same manner and with the same effect as the layer E.

My improved battery may be put together in a variety of ways. For instance, the negative electrode having been inserted centrally in the cup or cylinder formed by the porous fibrous substance E, the space around the carbon is filled in with the mixture F, and the cup or cylinder is then sealed with a layer $f$ of wax. Then the lining C is placed in position in the cup-shaped positive electrode and the bottom of the cup is covered with a thin layer of the mixture D. The cylinder or cup E, containing the mixture F and the negative electrode, is then placed in the center of the cup, and the space between the lining C and the cup or cylinder E is then filled with the mixture D, which contains an exciting-salt, and it is suitably moistened. When it is desired to produce a hermetically-sealed battery, the cup B is then sealed with a layer of wax $b'$. It is not my intention, however, to limit my invention either to any particular way of putting the battery together or to any particular substances employed as exciting and depolarizing agents.

I do not claim herein the combination of a zinc element forming a casing, a carbon element within the zinc element, an excitant between the said two elements, and absorbent material between the inner surface of the zinc element and the excitant, as that construction is claimed in my pending application, Serial No. 400,309, filed July 22, 1891, of which this application is a division.

Having thus described my invention, what I claim as new, and desire to secure by Letters Patent, is—

In a dry battery, the combination of the positive electrode forming a casing, a negative electrode within the positive electrode, the layers D and F, which contain depolarizing and exciting agents arranged between said electrodes, a layer or lining of absorbent material interposed between the positive electrode and the layer D, and a layer of absorbent material interposed between the layers D and F, substantially as shown.

HARRY T. JOHNSON.

Witnesses:
S. G. METCALF,
W. W. SHAW.